Aug. 13, 1963

A. R. BIEDESS 3,100,563

ARTICULATED CONVEYOR

Original Filed March 21, 1959

INVENTOR.
ANTHONY R. BIEDESS

BY

ATTORNEY

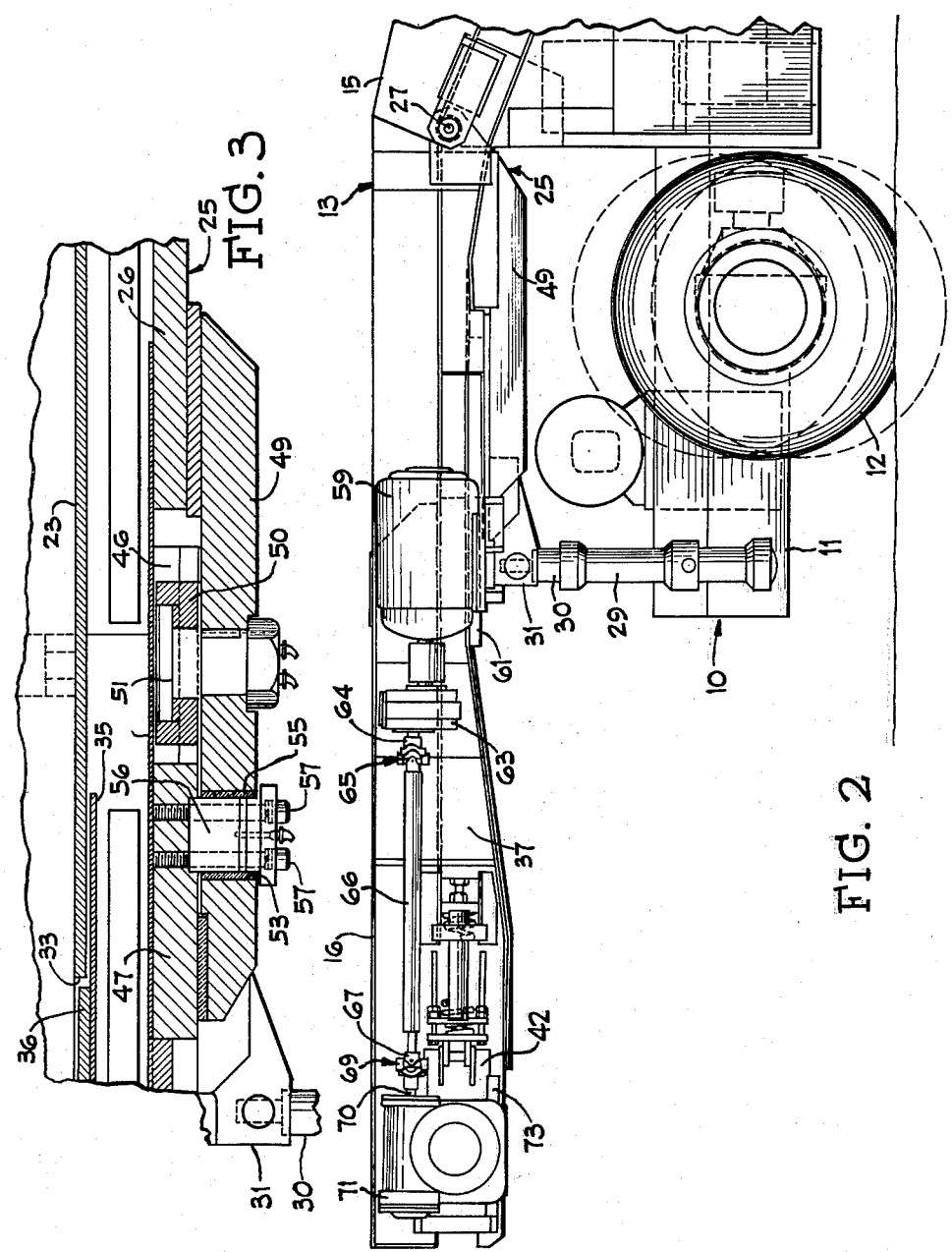

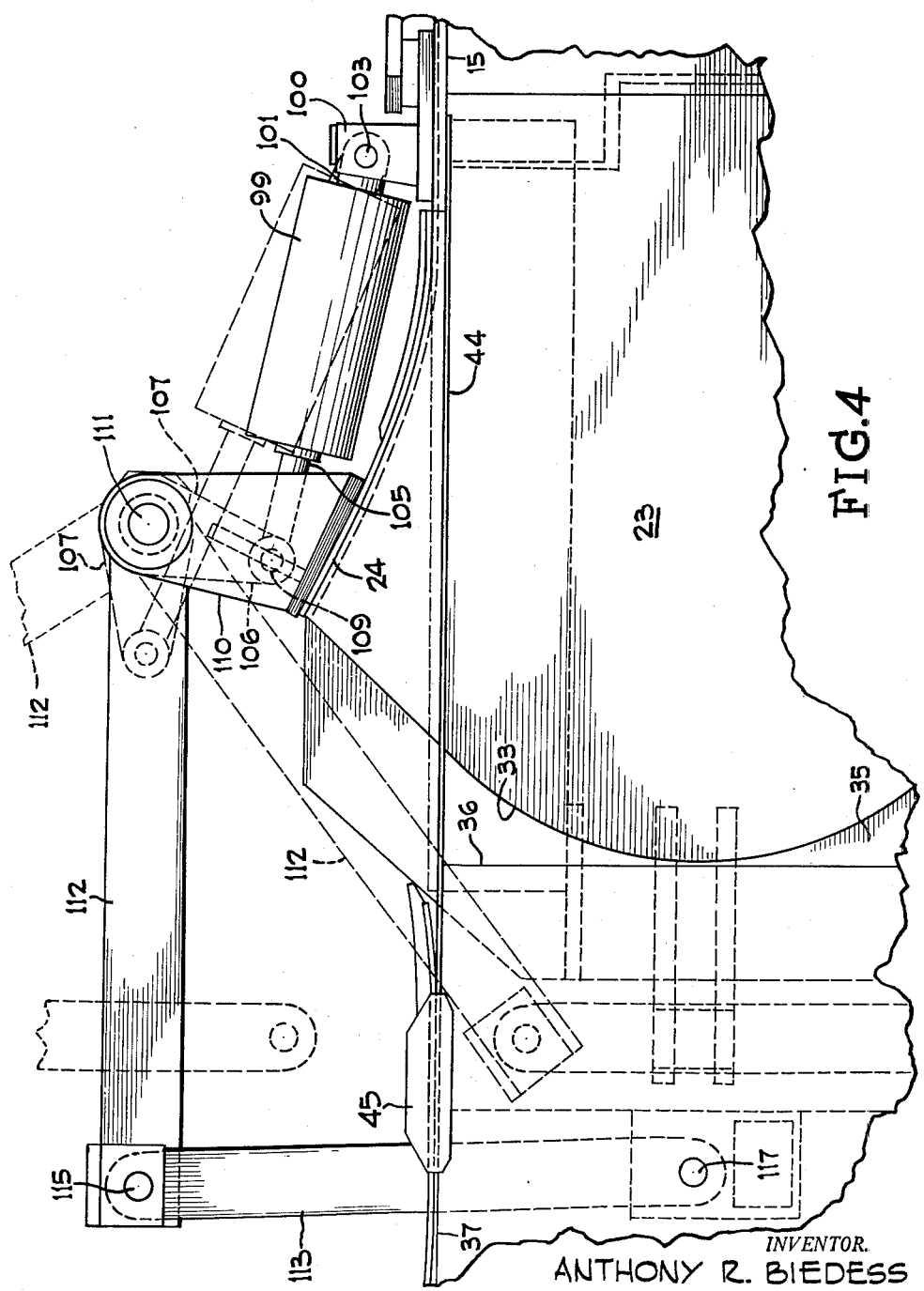

United States Patent Office 3,100,563
Patented Aug. 13, 1963

3,100,563
ARTICULATED CONVEYOR
Anthony R. Biedess, Chicago, Ill., assignor to Goodman Manufacturing Company, Chicago, Ill., a corporation of Illinois
Original application Mar. 21, 1959, Ser. No. 803,134, now Patent No. 3,008,566, dated Nov. 14, 1961. Divided and this application Oct. 6, 1961, Ser. No. 143,376
7 Claims. (Cl. 198—124)

This invention relates to improvements in articulated conveyors and more particularly relates to improvements in the swinging and tensioning means for loading machine types of articulated conveyors particularly adapted for use in mines underground.

This application is a division of my application Serial No. 803,134, filed March 21, 1959 and entitled "Articulated Conveyor," now Patent No. 3,008,566.

A principal object of the invention is to provide a simplified form of articulated conveyor having a more efficient and compact mechanism for laterally swinging the conveyor.

Another object of the invention is to provide means for laterally swinging the conveyor of an articulated conveyor for a loading machine and the like in which a relatively short stroke cylinder and piston may be used to swing the conveyor laterally to the full extent of lateral movement thereof in both directions from the longitudinal center line of the conveyor.

A further object of the invention is to provide an articulated conveyor of the laterally flexible center strand chain and flight type, having a laterally swingable trough section moved longitudinally during lateral swingable movement thereof, to maintain a uniform tension on the chain for the conveyor, in which the means for swinging the conveyor laterally exerts a swinging force on the conveyor tending to extend the conveyor during movement away from the longitudinal center line thereof and tends to retract the conveyor during movement toward the longitudinal center line thereof, and thereby cooperates with the mechanism for extensibly and retractibly moving the conveyor to compensate for changes in length of the conveyor as it is swung from side to side.

These and other objects of the invention will appear from time to time as the following specification proceeds and with reference to the accompanying drawings wherein:

FIGURE 2 is a fragmentary view in side elevation of the rear end portion of the loading machine shown in FIGURE 1;

FIGURE 3 is a detail fragmentary longitudinal sectional view taken substantially along line III—III of FIGURE 1 and showing the swingable mounting for the discharge trough section of the conveyor; and FIGURE 4 is an enlarged fragmentary plan view of the conveyor showing the positions of the linkage mechanisms for swinging the conveyor to its extreme positions of adjustment.

Figure 1:
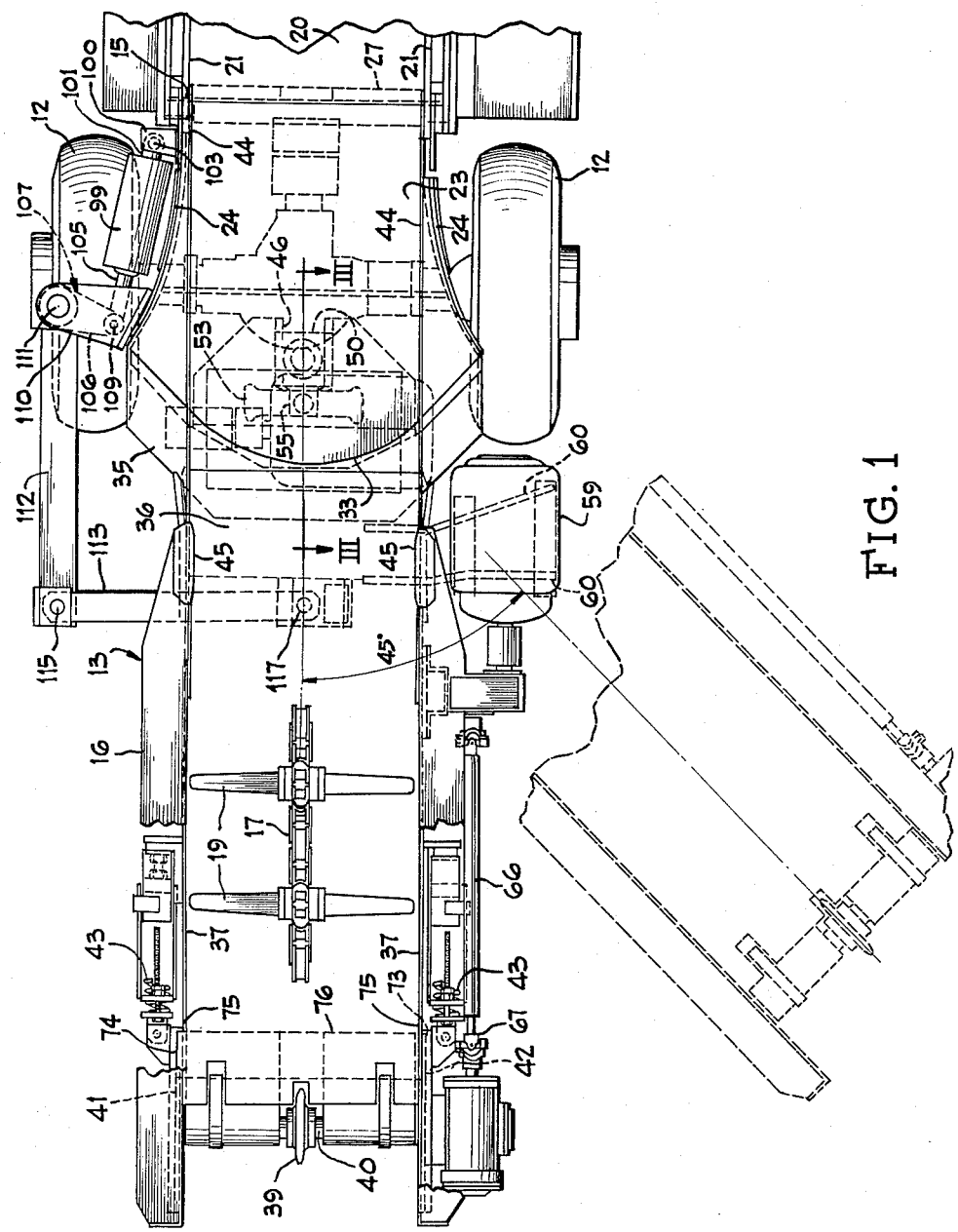
FIGURE 1 is a fragmentary plan view of the rear end portion of a loading machine and illustrating one form in which my invention may be embodied.

In the embodiment of the invention illustrated in the drawings, the rear end portion of a loading machine 10 of a type operable in mines underground is shown for illustrative purposes. The loading machine 10 includes a main frame 11 mounted on rubber tired wheels 12. An articulated conveyor 13 is shown as extending along the main frame 11 and as including a front elevating trough section 15 and a rear discharge trough section 16, extending therefrom and mounted on the main frame 11 for lateral and vertical adjustable movement with respect to the front trough section 15.

The conveyor 13 is shown as being a center strand laterally flexible endless chain and flight type of conveyor including a plurality of aligned strands of chain 17 pivotally connected at their ends to laterally extending flights 19 for movement with respect thereto about vertical axes. The endless chain comprising the strands of chain 17 and pivotally connected flights 19 is guided along the trough sections 15 and 16 on the ends of the flights 19, engaging the side walls of the trough sections of the conveyor, as is usual with such conveyors.

The trough section 15 is only fragmentarily shown herein and has the usual idler sprocket (not shown) mounted at its forward end about which the chain 17 and flights 19 change their direction of travel as they move upwardly along a bottom plate 20 of said trough section between side walls 21 thereof, extending along opposite sides of said bottom plate. The bottom plate 20 terminates into a stationary plate 23 flaring outwardly toward its rear end portion and having flared side walls 24 extending therealong to the rear end portion thereof.

The stationary plate 23 is a part of a box-like frame structure 25 (see FIGURES 1 and 3). The box-like frame structure 25 includes a bottom plate 26 along which the return run of the chain 17 and flights 19 travel when moving toward the front of the conveyor. The box-like frame structure 25 forms a support for the discharge trough section 16 and is mounted at its forward end for vertical movement about the axis of a pivot shaft 27, mounting the discharge trough section 16 for vertical movement about the axis of said pivot shaft by operation of spaced hydraulic jacks 29 mounted on opposite sides of the main frame 11 adjacent the rear end portion thereof, as shown in FIGURE 2. The hydraulic jacks 29 may be transversely pivoted to the main frame 11 in a suitable manner, and have extensible piston rods 30 pivotally connected to connectors 31, secured to and depending from the box-like frame structure 25, to vertically adjust the trough-section 15 about the axis of the pivot shaft 27 in an obvious manner, so not herein shown or described further.

The stationary plate 23 flares outwardly toward its rear end portion and has a generally arcuate rear end portion 33 overlapping a widened stationary plate 35, along which moves a bottom palte 36 of the trough section 16 during lateral adjustable movement of said trough section.

The trough section 16 includes the bottom plate 36 and parallel spaced side walls 37 extending therealong, and has a drive sprocket 39 for the conveyor chain 17, keyed or otherwise secured to a transverse shaft 40. The shaft 40 is journalled adjacent its opposite ends in bearing support plates 41 and 42 slidably mounted in the side walls 37 and retained in position by take ups including compression springs 43, 43, loaded to maintain the chain 17 under zero tension during operation of the conveyor, as has been clearly shown and described in my Patent No. 3,008,566, of which this application is a division.

The side walls 21 are connected with the side walls 37 of the trough section 16 by flexible side walls 44, secured at their advance ends to the side walls 21 and extending across the bottom plate 23. The flexible side walls 44 are slidably guided in guides 45 mounted on the side walls 37 of the trough section 16 adjacent the advance ends thereof, and extending inwardly therefrom (FIGURES 1 and 5).

A pivot means is provided to maintain the length of the path of travel of the chain 17 and flights 19 uniform during lateral swinging movement of the discharge end portion of the conveyor, which is herein shown as comprising a generally longitudinally extending guide 46 extending along a plate 47 and opening toward the forward end of said plate. The plate 47 forms a laterally movable support for the trough section 16 and is movably mounted on a bottom plate 49 of the box-like frame structure 25. The guide 46 is slidably engaged by a block 50 pivotally mounted on a pivot pin 51, keyed or otherwise secured to the plate 49.

The plate 49 has a transversely extending slot 53 formed therein and spaced rearwardly of the slot 46 and 50. The slot 53 is slidably engaged by a bearing block 55 mounted on a pivot pin 56 depending from the bottom of the plate 47 and secured thereto, as by cap screws 57.

The bearing blocks 50 and 55 thus form movable pivots for the laterally swingable discharge end portion 16 of the conveyor, and serve to retract the discharge end portion 16 of the conveyor, when the conveyor is in the longitudinally aligned position shown in FIGURE 1 and to extend said discharge end portion of the conveyor, as the conveyor swings laterally to one side or the other of center, to maintain a path of travel for the conveyor chain 17 and flights 19, which is of a uniform length in all positions of lateral adjustment of the trough section 16.

The drive to the conveyor chain 17 and flights 19 includes a motor 59 mounted on spaced brackets 60 extending laterally from a bottom plate 61 forming a continuation of the plate 47 (FIGURES 1 and 2). The motor 59 has drive connection with a speed reducer 63, mounted on the outer side of the left hand side wall 37 and spaced outwardly therefrom. The speed reducer 63 has a drive member 64 of a universal coupling 65 journalled therein and driven thereby. The universal coupling 65 drives a hollow shaft 66 having slidable driving engagement with a drive member 67 of a universal coupling 69. The driven member of the universal coupling 69 is mounted on the outer end of a shaft 70, journalled in a worm and worm gear housing 71. The worm and worm gear (not shown) within the worm gear housing 71 has driving connection with the shaft 40 for driving said shaft. The worm and worm gear housing 71 is mounted on the bearing support plate 42 and extends outwardly therefrom. The bearing support plate 42 in turn is slidably mounted in spaced gibbed guides 73 extending along one side wall 37 and affords a means to accommodate the shaft 40 and sprocket 39 to move backwardly in cases where rock and the like may become entrained between the chain 17 and flights 19 and the sprocket 39. The bearing support plate 41, like the bearing support plate 42, is slidably guided in gibbed guides 74 extending along the opposite side wall 37.

The springs 43 are provided to bias the bearing support plates 41 and 42 in position to maintain the proper tension on the chain 17, which in the present invention is maintained under zero tension when the conveyor is idle, and to accommodate backward movement of the shaft 40 and sprocket 39 when rock, cutter bits and the like may be entrained between the chain 17 and the sprocket 39 as shown and described in my Patent No. 3,008,566, of which this is a division.

Referring now in particular to the means for swinging the trough section 16 laterally, and at the same time exerting a swinging action on said trough section tending to lengthen the conveyor as the trough section 16 moves away from center and to shorten the conveyor as the trough section 16 is moved back toward center, a hydraulic actuator, such as a hydraulic jack including a short cylinder 99 having a short stroke piston therein (not shown) is provided to swing the discharge end portion of the conveyor laterally as desired. The cylinder 99 is mounted at its head end between spaced ears 100 extending laterally of the right hand wall 24, adjacent the advance end portion thereof. The ears 100 extend along opposite sides of a connector 101, extending from the head end of the cylinder 99, and pivotally connected to said ears, as by a pivot pin 103. A piston rod 105 is extensible from the cylinder 99 and is pivotally connected to a short arm 106 of a bellcrank 107, as by a pivot pin 109. The bellcrank 107 is mounted between parallel spaced brackets 110 on a pivot pin 111. The brackets 110 are mounted on a flared side wall 24 adjacent the rear end thereof and extend outwardly therefrom. The short arm 106 of the bellcrank 107 extends inwardly of the pivot pin 111 toward the flared side wall 24.

A long arm 112 of the bellcrank 107 extends from the pivot pin 111 in generally parallel relation with respect to the trough section 16, when said trough section is in the centered position shown in FIGURE 1. The arm 112 extends from a point spaced forwardly of the slidable pivotal mounting for the trough section 16 to a position spaced a substantial distance rearwardly of the slidable pivotal mounting for said trough section and has a drive link 113 pivotally mounted on the outer end thereof on a pivot pin 115. The drive link 113 extends inwardly from the long arm 112 toward the center of the trough section 16 and is pivotally connected to the bottom portion of said trough section at the longitudinal center line thereof on the vertical pivot pin 117.

It may be seen with reference to FIGURES 1 and 5 that the relationship between the short arm 106 of the bellcrank 107 and the long arm 112 is such that the discharge trough section 16 will be swung by the long arm 112 through a greater angle than the angle of movement of the arm 106, thereby increasing the compactness of the mechanism for swinging the discharge trough section 16 laterally in either direction and enabling the swinging mechanism to be contained within the limits of the wheels 12 when the discharge trough section 16 is aligned with the trough section 15, as shown in FIGURE 1.

It should here be noted that the relationship between the point of connection of the long arm 112 to the drive link 113 and the point of connection of the drive link 113 to the pivot pin 117 with regard to the movable pivotal axes for the discharge trough section 16 is such that the drive link 113 exerts a pulling force on the discharge trough section 16 in a direction to tend to lengthen the conveyor, as the conveyor is swung outwardly past center in either direction. The drive link 113 acts in a direction to push the discharge trough section toward the flared plate 23 as the discharge trough section is moved toward center from laterally extended positions to either side of the machine. This materially reduces the forces required to lengthen or shorten the conveyor to conform to the path of travel of the chain 17 and thereby increases the efficiency of the mechanism for laterally positioning the discharge trough section of the conveyor and with the long arm 112 enables a short stroke cylinder and piston or hydraulic jack, to be used to laterally position the discharge trough section of the conveyor and obviates the necessity of providing cylinders and pistons on each side of the conveyor, as has heretofore been the practice with loading machines and combined mining and loading machines, to laterally position the conveyor of the machine.

While I have herein shown and described one form in which my invention may be embodied, it should be understood that various modifications and variations of the invention may be effected without departing from the spirit and scope of the novel concepts thereof.

I claim as my invention:
1. In an articulated conveyor,
   (1) a stationary trough section,
   (2) a laterally movable trough section,
   (3) a laterally flexible endless chain and flight conveyor movable along said trough sections,
   (4) mounting means for said laterally movable trough section guiding said trough section for movement longitudinally of said stationary trough section during lateral movement thereof,
   (5) a single hydraulic actuator vertically pivoted to the stationary of said trough sections, and
   (6) a link and leverage connection from said hydraulic actuator to said laterally movable trough section exerting a swinging force on said trough section tending to extend said trough section during movement away from the longitudinal center line of said sta- tionary trough section and tending to retract said laterally movable trough section as said trough section moves towards the longitudinal center line of said stationary trough section.

2. In an articulated conveyor,
 (1) two aligned trough sections, one of which is laterally swingable with respect to the other,
 (2) an endless chain and flight conveyor movable along said trough sections,
 (3) mounting means for the laterally swingable trough section maintaining the length of travel of said endless chain and flight conveyor uniform during lateral swinging movement of the laterally swingable trough section,
 (4) and means cooperating with said mounting means for laterally moving the laterally swingable trough section comprising,
  (a) a single hydraulic actuator vertically pivoted to the stationary of said trough sections to one side thereof,
  (b) a rocking member pivoted for movement about a vertical axis spaced to one side of the stationary of said trough sections and adjacent said hydraulic actuator,
  (c) a lever arm extending inwardly of said rocking member and pivotally connected with said hydraulic actuator,
  (d) a second lever arm extending from said rocking member along the laterally swingable trough section a substantial distance rearwardly of the mounting means for said laterally swingable trough section,
  (e) and a drive link connecting said second lever arm with the laterally swingable trough section adjacent the longitudinal center thereof.

3. In an articulated conveyor,
 (1) a main frame,
 (2) aligned stationary and movable trough sections extending along said main frame,
 (3) an endless chain and flight conveyor movable along said trough sections,
 (4) movable mounting means for said movable trough section maintaining the length of travel of said endless chain and flight conveyor uniform in all positions of lateral swinging movement of said movable trough section with respect to said stationary trough section,
 (5) and means for laterally moving said laterally swingable trough section and cooperating with said movable mounting means for maintaining a uniform tension on said endless chain and flight conveyor comprising
  (a) a single hydraulic actuator vertically pivoted to said stationary trough section to one side of said movable mounting means,
  (b) a bellcrank pivoted to said stationary trough section to the same side of said movable mounting means as said hydraulic actuator and having a short lever arm extending inwardly toward said stationary trough section,
  (c) means pivotally connecting said hydraulic actuator to said short lever arm,
  (d) said bellcrank having a long lever arm extending generally parallel to said trough sections when in aligned relation with respect to each other and terminating a substantial distance beyond said movable mounting means toward the discharge end of the conveyor,
  (e) and a drive link connecting said long lever arm with said movable trough section adjacent the longitudinal center thereof.

4. In an articulated conveyor,
 (1) two trough sections, one of which is laterally swingable with respect to the other,
 (2) an endless chain and flight conveyor movable along said trough sections,
 (3) means for effecting extensible movement of the laterally swingable trough section during swinging movement thereof away from the center line of the forwardmost of said trough sections, to maintain a substantially uniform tension on said endless chain,
 (4) and means for laterally swinging the laterally swingable trough section comprising,
  (a) a rockable member rockingly mounted to one side of said trough sections,
  (b) two lever arms of unequal length extending from said rockable member,
  (c) a hydraulic actuator operatively connected to the shorter of said lever arms, the longer of said lever arms extending longitudinally along said conveyor in substantially parallel relation with respect thereto when said trough sections are in aligned relation with respect to each other,
  (d) and a link pivotally connected to the longer of said lever arms and having pivotal connection with the laterally swingable trough section adjacent the center line thereof and exerting force on the swingable trough section tending to move the swingable trough section away from the stationary trough section upon movement of said swingable trough section away from the extended longitudinal center line of the stationary trough section, and exerting a force on said swingable trough section tending to move the swingable trough section towards the stationary trough section upon movement of said swingable trough section toward the extended center line of the stationary trough section.

5. In an articulated conveyor,
 (1) a main frame,
 (2) aligned stationary and laterally swingable trough sections supported on said main frame,
 (3) an endless chain and flight conveyor movable along said trough sections,
 (4) means for guiding the laterally swingable trough section for movement longitudinally outwardly with respect to the stationary trough section upon movement of said laterally swingable trough section away from centered relation with respect to the stationary trough section and longitudinally inwardly of the stationary of said trough sections upon movement of said movable trough section back to an aligned position with respect to said trough sections,
 (5) and means for laterally swinging said laterally swingable trough section and exerting forces thereon to tend to extend and retract said trough section comprising;
  (a) a rockable member mounted on said frame adjacent and to one side of the stationary trough section,
  (b) a short arm extending inwardly of said rocking member,
  (c) a hydraulic actuator pivotally connected to said stationary trough section and having pivotal connection with said short arm of said rocking member,
  (d) a relatively long arm extending from said rocking member in generally parallel relation with respect to said trough sections when said movable trough section is in aligned relation with respect to said stationary trough section,
  (e) and a link pivotally connected to said long arm adjacent the free end thereof, and pivotally connected to said movable trough section adjacent the longitudinal center thereof,
  (f) said rocking member and said short and long arms being so arranged with respect to the pivot of said movable trough as to apply a force to said link to tend to extend said trough sections with respect to each other upon movement of said movable trough section away from an aligned position with respect to said stationary trough section and to tend to force said trough sections toward each other upon movement of said movable trough section toward an aligned position with respect to said stationary trough section.

6. In an articulated conveyor,
(1) a frame,
(2) two aligned stationary and movable trough sections mounted on said frame,
(3) a center strand laterally flexible chain and flight conveyor movable along said trough sections,
(4) means for mounting the movable of said trough sections on said frame for lateral movement about a movable vertical axis,
(5) and means cooperating with said mounting means for laterally moving the movable axis of said trough sections and exerting a force thereon to effect extensible movement of said trough section upon lateral movement out of aligned relation with respect to said stationary trough section, and to effect retractible movement of said trough section upon movement of said trough section into alignment with said stationary trough section comprising;
  (a) a bellcrank pivotally mounted to one side of said frame adjacent said stationary trough section and having
  (b) a short lever arm extending inwardly toward said conveyor in advance of the movable axis of said movable trough section, and
  (c) a substantially longer lever arm extending a substantial distance rearwardly of the movable axis of said movable trough section, in generally parallel relation with respect to said trough sections when in alignment with each other,
  (d) a link connected to the free end of the longer of said lever arms and extending inwardly therefrom at substantially right angles with respect thereto and having pivotal connection with said movable trough section adjacent the longitudinal axis thereof,
  (e) a hydraulic actuator pivotally connected to said frame adjacent said stationary trough section and forwardly of said bellcrank and having
  (f) an extensible piston rod pivotally connected to the short arm of said bellcrank,
  (g) the leverage arrangement between said arms of said bellcrank with respect to the axis of pivotal movement of said movable trough section and the length of the long arm of said bellcrank being so proportioned with respect to the short arm thereof as to swing the movable trough section through a greater arc of movement than the arc of movement of the short arm of said bellcrank and to exert a longitudinally outward pushing force on said movable trough section during movement thereof away from aligned relation with respect to said stationary trough section and to exert a longitudinally inward pulling force on said movable trough section upon movement thereof into aligned relation with respect to said stationary trough section.

7. In an articulated conveyor particularly adapted for loading machines and the like;
(1) a main frame,
(2) traction devices supporting said main frame for movement along the ground,
(3) aligned stationary and movable trough sections mounted on said main frame,
(4) a center strand laterally flexible endless chain and flight conveyor movable along said trough sections,
(5) means for mounting the movable of said trough sections on said main frame for lateral movement about a movable axis,
(6) a motor mounted on said movable trough section to one side thereof and within the limits of said traction devices,
(7) a sprocket at the rear end of said movable trough section for driving said endless chain and flights,
(8) a drive connection from said motor to said endless chain and flights,
(9) and means at the opposite side of said main frame from said motor and within the limits of said traction devices when said trough sections are in aligned relation with respect to each other, for swinging said movable trough section laterally out of aligned relation with respect to said stationary trough section and exerting a pulling longitudinally outward force on said movable trough section during lateral swinging movement thereof out of aligned relation with respect to said stationary trough section, and exerting a longitudinally inward pushing force on said movable trough section upon movement thereof into aligned relation with respect to said stationary trough section, comprising;
  (a) a bellcrank pivotally mounted on said main frame and having
  (b) a vertical pivotal axis spaced to one side of said main frame in advance of the movable axis of said movable trough section,
  (c) and also having a short arm extending inwardly toward said trough sections,
  (d) a hydraulic actuator pivoted to said main frame adjacent the stationary of said trough sections and having
  (e) a piston rod pivotally connected to said short arm of said bellcrank,
  (f) said bellcrank also having a long arm extending in generally parallel relation with respect to said trough sections when in aligned relation with respect to each other a substantial distance along the movable of said trough sections,
  (g) and a link pivotally connected to the free end of said long arm at one end and to the movable of said trough sections adjacent the longitudinal axis thereof, and extending from said long arm at substantially right angles with respect thereto when said trough sections are in aligned relation with respect to each other.

References Cited in the file of this patent
UNITED STATES PATENTS
2,695,700   Lindgren _____ Nov. 30, 1954